(12) United States Patent
Bohrmann et al.

(10) Patent No.: US 9,499,008 B2
(45) Date of Patent: Nov. 22, 2016

(54) VEHICLE WHEEL

(75) Inventors: Gerhard Bohrmann, Boehl-Iggelheim (DE); Uwe Gleiter, Neustadt (DE); Heiko Hess, Lauterecken (DE); Walter Rau, Mannheim (DE); Sven Wenigmann, Mannheim (DE); Joerg Schnorr, Ludwigshafen (DE); Willi Bartholomeyzik, Hassloch (DE)

(73) Assignee: BASF SE, Ludwigshafen (DE)

( * ) Notice: Subject to any disclaimer, the term of this patent is extended or adjusted under 35 U.S.C. 154(b) by 487 days.

(21) Appl. No.: 13/398,221

(22) Filed: Feb. 16, 2012

(65) Prior Publication Data

US 2012/0212037 A1 Aug. 23, 2012

Related U.S. Application Data

(60) Provisional application No. 61/563,615, filed on Nov. 25, 2011, provisional application No. 61/527,141, filed on Aug. 25, 2011, provisional application No. 61/443,756, filed on Feb. 17, 2011.

(51) Int. Cl.
   *B60B 1/00*   (2006.01)
   *B60B 3/14*   (2006.01)
   *B60B 5/02*   (2006.01)

(52) U.S. Cl.
   CPC ........ *B60B 3/147* (2013.01); *B60B 5/02* (2013.01)

(58) Field of Classification Search
   CPC ............ B60B 3/008; B60B 3/14; B60B 3/147; B60B 3/145; B60B 5/00; B60B 5/02
   USPC .................. 301/35.627, 35.629, 35.632, 301/64.701–64.703
   See application file for complete search history.

(56) References Cited

U.S. PATENT DOCUMENTS

| 2,970,008 | A | * | 1/1961 | Leach | ............................... 301/1 |
| 3,759,576 | A | * | 9/1973 | Richter | .................... 301/35.629 |

(Continued)

FOREIGN PATENT DOCUMENTS

| DE | 42 02 287 A1 | 8/1992 |
| DE | 196 08 601 A1 | 9/1997 |

(Continued)

OTHER PUBLICATIONS

International Preliminary Report on Patentability issued Aug. 17, 2013 in PCT/EP2012/052599 (English Translation only).

(Continued)

Primary Examiner — Jason Bellinger
(74) Attorney, Agent, or Firm — Oblon, McClelland, Maier & Neustadt, L.L.P.

(57) ABSTRACT

The invention concerns a vehicle wheel, comprising a body of a plastics material and at least one adapter for fastening the body to a wheel mounting, the at least one adapter having at least one protuberance which engages in a recess in the body, or, if multiple adapters are used, at least one adapter is formed such that it engages in a recess of the body over its full surface area, the adapter being arranged in such a way that, after assembly of the body on the wheel mounting, the adapter is positioned between the body and the wheel mounting, or the adapter being arranged in such a way that the body is positioned between the wheel mounting and the adapter, so that the adapter lies on the outside of the body after assembly.

20 Claims, 5 Drawing Sheets

(56) References Cited

U.S. PATENT DOCUMENTS

| | | | |
|---|---|---|---|
| 3,811,737 A * | 5/1974 | Lejeune | 301/64.703 |
| 3,820,851 A * | 6/1974 | Longo et al. | 301/35.629 |
| 3,870,371 A | 3/1975 | Solomon | |
| 4,679,860 A * | 7/1987 | Koishi et al. | 301/35.632 |
| 4,708,397 A * | 11/1987 | Weinmann | 301/35.632 |
| 4,900,097 A * | 2/1990 | Kostov et al. | 301/64.702 |
| 5,277,479 A | 1/1994 | Koyama et al. | |
| 5,401,079 A * | 3/1995 | Rooney | 301/6.91 |
| 6,685,275 B2 * | 2/2004 | Gorges et al. | 301/35.629 |
| 6,715,843 B2 * | 4/2004 | Teague | 301/35.621 |
| RE38,779 E * | 8/2005 | Lovitt, Jr. | 301/35.629 |
| 7,040,714 B2 * | 5/2006 | Schroeder et al. | 301/64.706 |
| 7,287,819 B2 * | 10/2007 | McNeil | 301/35.629 |
| 7,377,596 B2 * | 5/2008 | Steinke et al. | 301/64.703 |
| 2003/0006079 A1 | 1/2003 | Buell et al. | |
| 2013/0049443 A1 * | 2/2013 | He et al. | 301/64.703 |

FOREIGN PATENT DOCUMENTS

| | | | |
|---|---|---|---|
| DE | 199 40 524 A1 | 4/2001 | |
| DE | 100 06 400 A1 | 8/2001 | |
| EP | 0 529 492 A1 | 3/1993 | |
| JP | 62-90802 U | 6/1987 | |
| JP | 62-128801 A | 6/1987 | |
| JP | 63-180401 A | 11/1988 | |
| JP | 4-254201 A | 9/1992 | |
| JP | 5-28702 A | 4/1993 | |
| JP | 7-228101 A | 8/1995 | |
| JP | 9-20104 A | 1/1997 | |
| JP | 9-48201 A | 2/1997 | |
| JP | 2003-49883 A | 2/2003 | |
| WO | WO2012/110560 | * 8/2012 | 301/64.703 |

OTHER PUBLICATIONS

Japanese Office Action issued Jan. 19, 2016 in Patent Application No. 553920/2013 (English Translation only).

* cited by examiner

VEHICLE WHEEL

The invention concerns a vehicle wheel, comprising a body of a plastics material.

At present, bodies for vehicle wheels, in particular for motor vehicles, are produced from metallic materials, usually from steel or aluminum. The body is fastened to a wheel mounting, usually a brake drum or brake disk of the motor vehicle by spherical-head screws or taper-head screws. As a result, the body is pressed against the mounting and the force transmission from the vehicle drive to the body is brought about by friction between the body and the area of contact of the body on the brake drum or the brake disk.

To reduce the consumption of the motor vehicle, and consequently to save energy, it is intended to reduce the weight of the vehicle. For this purpose, it is endeavored, for example, to produce as many components of the vehicle as possible from materials of low weight, for example from plastics, and to replace the currently used metallic materials by plastics.

It is already known from DE-U 297 06 229 to produce bodies for a motor vehicle from a fiber-reinforced plastic. However, on account of the great forces that are transmitted to the rim, the plastic of the body does have a tendency to creep, which leads to deforming of the rim. Even fiber reinforcement is not sufficient here to prevent the creep, and the associated deformation. Moreover, too high a proportion of fibers, that would ensure sufficient strength with respect to the tendency to creep, has the effect that the material from which the body is produced becomes too brittle, and consequently does not withstand the loads that occur during driving with the motor vehicle. This is manifested by cracks in the rim, which may lead to rupturing.

It is therefore an object of the present invention to provide a vehicle wheel having a body of a plastics material and a mounting with which the force can be transmitted to the body without the plastics material of the body beginning to creep and with which the plastics material is also elastic enough that it does not crack or rupture.

The object is achieved by a vehicle wheel, comprising a body of a plastics material and at least one adapter for fastening the body to a wheel mounting, the at least one adapter having at least one protuberance which engages in a recess in the rim, or, if multiple adapters are used, at least one adapter is formed such that it engages in a recess of the body over its full surface area, the adapter being arranged in such a way that, after assembly of the body on the wheel mounting, the adapter is positioned between the body and the wheel mounting, or the adapter being arranged in such a way that the body is positioned between the wheel mounting and the adapter, so that the adapter lies on the outside of the body after assembly.

Within the scope of the present invention, the term "rim" is understood as meaning a wheel for a motor vehicle without tires. The body consequently comprises the body band with the body base for receiving the tire and the body star or the wheel disk or wheel nave.

Use of the at least one adapter with at least one protuberance which engages in a corresponding recess of the rim, or at least one adapter which engages in a recess of the body over its full surface area, allows a force transmission by friction to the adapter and by positive engagement at the protuberances engaging in the recesses. As a result, no force is transmitted directly to the body by friction and the deformation of the body caused by creep in the region of the fastening devices is reduced to the extent that it is no longer harmful to the functioning of the rim. Moreover, it is possible to use a plastic with a lower proportion of fibers for reinforcement, so that the elasticity of the material that is necessary for the body is preserved.

If multiple adapters are used, it is preferred to form each adapter with only one protuberance. If only one adapter is used, it is preferred to form it with multiple protuberances. If multiple adapters are used, it is also preferred to form them as a segments of a circle or segments of a ring. Furthermore, if multiple adapters are used, it is also possible and preferred to form all the adapters such that they engage over their full surface area in a recess of the body that is respectively adapted to the shape of the adapter. It is particularly preferred in this respect if the recesses are respectively formed such that the adapter engaging in the recess can be placed completely in the recess, it being further preferred here if the adapter finishes flush with the surface of the rim.

If the adapter is formed such that it lies on the outside of the body after assembly, it is preferred if a disk which is connected to the adapter through at least one opening in the body is arranged on the side of the body that is facing the wheel mounting. Use of the disk achieves an additional strengthening of the rim. Moreover, after assembly, the body does not lie directly with the plastic on the wheel mounting, and so as a result the durability of the body during operation is improved. In particular, in this way it can be avoided that the body begins to creep as result of the forces acting during operation.

In a particularly preferred embodiment, the disk has a peripheral edge which, after assembly, is in contact with the wheel mounting. As a result, a uniform force distribution from the wheel mounting to the body is achieved. This has the effect in particular that stresses and associated damage of the body can be avoided. The peripheral edge with which the disk lies on the wheel mounting is achieved, for example, by a conical form of the side of the disk that is facing the wheel mounting. Apart from a conical form, however, a concave form of the disk, for example, is also conceivable. Alternatively, it would also be possible to provide a peripheral protuberance on the disk. It is preferred, however, to form the disk conically on the side facing the wheel mounting. This makes it possible to form the disk in a conical manner on one side and in a planar manner on the opposite side. Alternatively, the entire disk may also be conically formed.

To be able to transmit force from the adapter to the disk and/or the wheel mounting, it is further preferred if the at least one opening accommodates a sleeve which lies with one end face against the adapter or fits exactly in an opening in the adapter and lies with the other end face against the wheel mounting or against the disk or fits exactly in an opening in the wheel mounting or the disk. The sleeve is in this case preferably produced from the same material as the adapter. In one embodiment of the invention, the sleeve is formed in one part with the adapter. Alternatively, it is also possible to form the sleeve in one part with the disk or the wheel mounting. In the case of a one-part form of the sleeve with the adapter, the sleeve preferably lies with its end that is remote from the adapter against the wheel mounting or the disk or fits exactly in an opening in the disk or the wheel mounting. Correspondingly, in the case of a one-part form of the sleeve with the wheel mounting or the disk, the end of the sleeve that is facing away from the wheel mounting or the disk lies on the adapter or fits exactly in an opening in the adapter. For the purposes of the invention, fits exactly means that the sleeve lies against the opening without any play over its entire circumference.

The sleeve is preferably formed such that it is designed to receive a screw for the assembly of the body on the wheel mounting. In this case, the sleeve serves at the same time for the force transmission from the screws with which the body is fastened to the wheel mounting. In the region of the through-openings for the screws for fastening the body to the wheel mounting, the adapter is preferably formed in the case of an externally lying adapter such that a recess is formed in the adapter, so that spherical-collar screws or taper-collar screws can be used for the assembly of the rim, as are also used at present for the assembly of steel bodies or aluminum rims.

As an alternative to the use of only one disk, it is also possible to use multiple disks. For example, a disk may be provided here at each position of a screw for the assembly of the body on the wheel mounting. It is also possible to form the disk such that multiple screws, for example two screws or three screws, are respectively passed through a disk. The use of multiple disks is possible in particular if multiple adapters are used. In this case, for example, each adapter may be assigned a disk. Alternatively, it is also possible to assign a disk respectively to multiple adapters. However, the use of only one disk, which is preferably formed as a ring, is preferred.

In an alternative embodiment, the adapter lies with a first area against the wheel mounting and the protuberances are formed on the side opposite from the first area, so that the adapter is positioned between the wheel mounting and the rim.

In a further alternative embodiment, the adapter lies with a first area against the wheel mounting and is passed through at least one opening in the rim, a disk-shaped widening being formed on the adapter, on the side facing away from the wheel mounting, and the protuberances being formed on the disk-shaped widening such that they point in the direction of the wheel mounting and engage in recesses on the outer side of the rim. The adapter may in this case be passed through multiple openings in the rim. It is preferred, however, if a central opening through which the adapter is passed is formed in the rim.

Both in the case of the embodiment in which the adapter is positioned between the body and the wheel mounting and in the case of the embodiment in which a disk of the adapter lies on the outside of the body and the adapter is passed through at least one opening in the rim, the adapter can be connected to the wheel mounting and the body can be connected to the adapter by separate fastening means. However, it is preferred in both cases to connect the body and the adapter jointly to the wheel mounting.

Apart from the embodiment in which the adapter is formed in one part with the wheel mounting and the embodiment in which the adapter is a separate component, it is also possible to form the adapter and the body in one part. Here, the adapter is preferably enclosed by the plastics material of the rim. If the body is produced by an injection-molding process or some other molding or casting process, it is preferred if the adapter is encapsulated by the body material. This has the advantage that the adapter can be firmly embedded in the rim. A still better connection of the adapter and the body can be achieved if the adapter has an undercut. In this case, plastics material is poured into the undercut and so a stable connection is obtained. Furthermore, the connection of the plastics material and the adapter may be improved by working the adapter surface, for example roughening the adapter surface, knurling the adapter surface or applying an adhesion promoter to the adapter surface or to the plastics material.

If the adapter is connected to the body in one part, it is possible to provide a single adapter or multiple adapter parts which are connected to the rim. If multiple adapter parts are provided, they are preferably arranged such that they are uniformly distributed over the circumference of the rim, in order to ensure a uniform force transmission from the wheel mounting to the rim.

In a particularly preferred embodiment with a one-part configuration of the body and the adapter, the bushes in the screw through-holes are used as adapters. Preferably used for this purpose are bushes which have a wall thickness which is sufficiently great to transmit the frictional forces for driving and for braking from the wheel mounting to the rim. Alternatively, it is also possible to use bushes which have a dish-shaped widening at least on one side. The dish-shaped widening is in this case formed flush with the body surface, so that, during assembly of the body on the wheel mounting, the dish-shaped widening lies against the wheel mounting, so that the force is transmitted from the wheel mounting to the body via the dish-shaped widening.

Alternatively, it is also possible to produce the bushes in the screw through-holes and the adapter as one part. In this case, the bushes act in an assisting manner in the force transmission, but do not represent the main force transmission surfaces of the adapter.

To increase the stability and strength of the rim, in one embodiment portions which extend in the direction of the spokes of the body are formed on the adapter. If multiple adapters are provided, adapters which are positioned as an extension of a spoke preferably have a corresponding portion that extends in the direction of the spoke. The portion extending in the direction of the spoke may in this case have the same thickness as the adapter or else is formed with a smaller wall thickness. If the portion is formed with a smaller wall thickness, it is preferred if the transition from the thickness of the adapter to the thickness of the portion proceeds smoothly.

In the case of a one-part configuration of the adapter with the wheel mounting, the protuberances which engage in the recesses of the body are formed directly on the wheel mounting. This dispenses with the need for the force transmission to the adapter by friction. Also in this embodiment, the force transmission to the body takes place by positive engagement at the protuberances of the wheel mounting engaging in the recesses.

If the adapter is formed in one part with the rim, the force is likewise transmitted from the adapter to the body by positive engagement. The force which is transmitted from the body to the adapter is transmitted by friction from the wheel mounting to the area of the adapter lying on the wheel mounting. A one-part form of the adapter with the body is achieved, for example, by the adapter being encapsulated in the polymer material from which the body is produced during the production of the rim.

To allow optimum transmission of the force at the protuberances from the adapter to the rim, it is preferred if the protuberances of the adapter and the recesses of the body are in each case conically formed, so that, during assembly, the protuberances of the adapter are pressed into the recesses of the rim. This ensures play-free seating of the body on the adapter.

To obtain the play-free seating during assembly, the protuberances on the adapter are preferably dimensioned such that a gap forms between the body and the adapter when the body is placed on. When the screws with which the body is fastened to the adapter are tightened, the protuberances are pressed into the recesses and the playfree seating is obtained. The gap produces a prestressing on the conical contact area of the protuberance and the recess.

For assembly with a separate adapter, it is possible first to connect the adapter to the wheel mounting and then to fasten the body to the adapter. The connection of the adapter to the wheel mounting and of the body to the adapter preferably takes place in each case by screwing. Alternatively and with preference, however, the body and the adapter should be jointly connected to the wheel mounting. For this purpose, screw through-holes are usually provided in the body and in the adapter and holes with an internal thread provided at corresponding positions in the wheel mounting. For fastening, screws are passed through the screw through-holes in the body and the adapter and screwed into the internal thread of the wheel mounting. Flanged screws with a flat head, on which the body and the sleeve or adapter rests, are preferably used as fastening screws.

As an alternative to screws that are passed through the body and the adapter and screwed in holes with an internal thread in the wheel mounting, it is also possible to provide on the wheel mounting threaded bolts, which are passed through the screw through-holes in the adapter and the body and then fixed by suitable nuts.

In order when screwing the body to avoid the body being damaged on account of the screwing forces in the region of the screw through-holes, it is preferred to insert bushes in the screw through-holes. The bushes are in this case preferably produced from a material that is stable with respect to pressure. The same material as that for the adapter is suitable as the material for the bushes. Particularly preferred as the material for the bushes are metals, in particular iron-based metals such as gray cast iron or steel.

If the adapter is formed in one part with the wheel mounting, the adapter is preferably produced from the same material as the wheel mounting. The wheel mounting is in this case formed for example on a brake drum or on a brake disk of a motor vehicle. Alternatively, the wheel mounting may also be formed on an electric motor which directly drives the vehicle wheel. Metals are usually used as the material for the wheel mounting, with preference metals comprising iron, with particular preference steel.

In the case of the adapter formed in one part with the wheel mounting, the wheel mounting has protuberances which engage in corresponding recesses of the rim. As a difference from a separate adapter, in which the body together with the adapter can be fitted on conventional wheel mountings, here the wheel mounting and the body are made to match each other, so that only bodies that have recesses corresponding to the protuberances on the wheel mounting can be used.

In the case of a separate adapter, it is preferably produced from a material which allows a force transmission between the wheel mounting and the adapter by friction. Suitable materials for the adapter are, for example, metallic materials, ceramics or highly filled plastics. Particularly suitable as the material for the adapter are metals, preferably aluminum, iron, titanium or magnesium, it also being possible for the metals to be mixtures or in the form of alloys. If iron is used, it is preferably in the form of steel. The adapter is in this case produced for example from a deep-drawn steel sheet. Alternatively, the adapter may also be produced from iron as a cast-iron part. Here, the iron may be used both in the form of cast steel and gray cast iron.

Suitable ceramics from which the adapter can be produced are, for example, ceramics based on aluminum oxide or silicon oxide.

If a plastic is used as the material for the adapter, highly reinforced thermosetting plastics are particularly preferred. As a difference from thermoplastic materials and plastics with only little reinforcement, highly reinforced plastics have less of a tendency to creep when a frictional force is applied. Since, moreover, the forces from the road can be absorbed by the rim, a more brittle material can be used for the adapter than for the rim.

With preference, the material for the body and the adapter is chosen such that the coefficients of linear thermal expansion of the material for the body and of the material for the adapter differ by no more than 70%, with preference by no more than 60%, on the basis of the coefficient of linear thermal expansion of the material for the adapter. If a plastics material is used as the material for the adapter and/or for the rim, the above condition should apply for a temperature range from 100 to 180° C. If a fiber-reinforced plastics material is used as the material for the body and/or the adapter, the condition should apply to a temperature range from 100 to 180° C. and a linear expansion parallel to the fiber, that is to say in the direction of the fiber.

A thermosetting or thermoplastic material is used as the material for the rim. This material may be used in a filled or unfilled state. With preference, however, filled polymers are used.

Suitable, for example, as polymers are natural and synthetic polymers or derivatives thereof, natural resins and synthetic resins and derivatives thereof, proteins, cellulose derivatives and the like. These may be—but do not have to be—chemically or physically curing, for example air-curing, radiation-curing or temperature-curing.

Apart from homopolymers, copolymers or polymer blends may also be used.

Preferred polymers are ABS (acrylonitrile-butadiene-styrene); ASA (acrylonitrile-styrene-acrylate); acrylated acrylates; alkyd resins; alkylene vinylacetates; alkylene-vinylacetate copolymers, particularly methylene vinylacetate, ethylene vinylacetate, butylene vinylacetate; alkylene-vinylchloride copolymers; amino resins; aldehyde and ketone resins; cellulose and cellulose derivatives, particularly hydroxyalkyl cellulose, cellulose esters, such as acetates, propionates, butyrates, carboxyalkyl celluloses, cellulose nitrates; epoxy acrylates; epoxy resins; modified epoxy resins, for example bifunctional or polyfunctional bisphenol-A or bisphenol-F resins, epoxy-novolak resins, bromated epoxy resins, cycloaliphatic epoxy resins; aliphatic epoxy resins, glycidyl ether, viny ether, ethylene-acrylic acid copolymers; hydrocarbon resins; MABS (transparent ABS comprising acrylate units); melamine resins; maleic acid-anhydride copolymers; (meth)acrylates; natural resins; colophony resins; shellac; phenolic resins; polyesters; polyester resins, such as phenylester resins; polysulfones (PSU); polyether sulfones (PESU); polyphenylene sulfone (PPSU); polyamides; polyimides; polyanilines; polypyroles; polybutylene terephthalate (PBT); polycarbonates (for example Makrolon® from Bayer AG); polyester acrylates; polyether acrylates; polyethylene; polyethylene thiophenes; polyethylene naphthalates; polyethylene terephthalates (PET); polyethylene terephthalate glycol (PETG); polypropylene; polymethyl methacrylate (PMMA); polyphenylene oxide (PPO); polyoxymethylene (POM); polystyrenes (PS); polytetrafluorethylene (PTFE); polytetrahydrofuran; polyether (for example polyethylene glycol, polypropylene glycol); polyvinyl compounds, particularly polyvinyl chloride (PVC), PVC copolymers, PVdC, polyvinyl acetate and copolymers thereof, optionally partially hydrolyzed polyvinyl alcohol, polyvinyl acetals, polyvinyl acetates, polyvinyl pyrrolidone, polyvinyl ether, polyvinyl acrylates and methacrylates in solution and as a dispersion as well as copolymers thereof, polyacrylates and polystyrene copolymers; polystyrene (toughened and non-toughened); polyurethanes, uncrosslinked or crosslinked with isocyanates; polyurethane acrylates; styrene acrylonitrile (SAN); styrene-acrylic copolymers; styrene-butadiene block copolymers (for example Styroflex® or Styrolux® from BASF SE, K-Resin™ from TPC); proteins, for example casein; SIS; triazine resin, bis-maleimide-triazine resin (BT), cyanate ester resin (CE) or allylated polyphenylene ether (APPE). Furthermore, blends of two or more polymers may be used.

Particularly preferred polymers are acrylates, acrylate resins, cellulose derivatives, methacrylates, methacrylate resins, melamine and amino resins, polyalkylenes, polyimides, epoxy resins, modified epoxy resins, for example bifunctional or polyfunctional bisphenol-A or bisphenol-F resins, epoxy-novolak resins, bromated epoxy resins, cycloaliphatic epoxy resins; aliphatic epoxy resins, glycidyl ether, cyanate ester, vinyl ether, phenolic resins, polyimides, melamine resins and amino resins, polyurethanes, polyesters, polyvinyl acetals, polyvinyl acetates, polystyrenes, polystyrene copolymers, polystyrene acrylates, styrene-butadiene block copolymers, styrene-acrylonitrile copolymers, acrylonitrile-butadiene-styrene, acrylonitrile-styrene acrylate, polyoxymethylene, polysulfones, polyether sulfones, polyphenylene sulfone, polybutylene terephthalate, polycarbonates, alkylene vinylacetates and vinylchloride copolymers, polyamides, cellulose derivatives as well as copolymers thereof and blends of two or more of these polymers.

Particularly preferred polymers are polyamides, for example polyamide 4, polyamide 6, polyamide 11, polyamide 12, polyamide 4.6, polyamide 6.6, polyamide 6.10, polyamide 6.12, polyamide 10.10, polyamide 12.12, polyamide MXD.6, polyamide 6/6.6, polyamide 6/12, polyamide 6.6/6/6.10, polyamide PACM.12, polyamide 12/MACM.I, and polyphthalamides, that is to say polyamides of which the dicarboxylic acid component comprises at least 50% by weight terephthalic and/or isophthalic acid. Particularly preferred of these are polyamide 4.6, polyamide 6, polyamide 6.6, polyamide 6.T/6, polyamide 6.T/6.I, polyamide 6.T/6.I/6.6, polyamide 10.T/6.T, polyamide 6.6/6.10, polyamide 6.6/6.12, polyamide 6.T/11, polyamide 6.T/12, polyamide 6.T/5-1.T, polyamide 9.T/8-1.T and mixtures of these. Further suitable polymers are polypropylene, polysulfones, polyether sulfones, polyphenylene sulfones, polybutylene terephthalate as well as blends thereof.

Customary additives may be admixed with the individual polymers, for example plasticizers, crosslinking agents, impact modifiers or flame retardants.

The polymer material is preferably reinforced. In particular, the polymer material is fiber-reinforced. Any fibers that are customary for reinforcement and are known to a person skilled in the art may be used for the reinforcement. Suitable fibers are, for example, glass fibers, carbon fibers, aramid fibers, boron fibers, metal fibers, mineral fibers or potassium titanate fibers. The fibers may be used in the form of short fibers, long fibers or continuous fibers. The fibers may also be oriented or randomly arranged in the polymer material. In particular when continuous fibers are used, however, an oriented arrangement is usual. The fibers may in this case be used for example in the form of individual fibers, fiber strands, mats, woven or knitted structures or rovings. If the fibers are used in the form of continuous fibers, as rovings or as fiber mats, the fibers are usually placed in a mold and then encapsulated with the polymer material. The body produced in this way may be a single-layered or multi-layered construction. In the case of a multi-layered construction, the fibers of the individual layers may in each case be directed in the same direction or the fibers of the individual layers are turned at an angle of −90° to +90° in relation to one another.

Within the scope of the present invention, short fibers are understood as meaning fibers with a length in the granular material of less than 5 mm. Long fibers are fibers in a granular material with a length in the range from 5 to 30 mm, with preference in the range from 7 to 20 mm. The processing of the granular material has the effect that the long fibers are generally shortened, so that in the finished component they generally have a length which may extend in the range from 0.1 mm to the maximum dimension of the granular material that is used. With conventionally used granular material sizes, the maximum length lies in the range of up to 12 mm. In the case of a granular material with greater dimensions, the maximum length of the fibers may also be greater than that.

Long fibers are used with preference. If long fibers are used, they are usually admixed with the polymer compound before curing. The main body of the wheel body may be produced, for example, by extrusion, injection molding or casting. With preference, the whole wheel body is produced by injection molding or casting. The long fibers are generally randomly arranged in the wheel body. If the wheel body is produced by an injection-molding process, the long fibers may be oriented by the polymer compound that comprises the fibers being forced through an injection nozzle into the mold. The proportion of the fibers in the polymer compound is preferably 30 to 70% by weight, in particular 45 to 65% by weight.

In a further embodiment, the polymer material comprises a mixture of short fibers and long fibers. In this case, the proportion of long fibers in the overall fiber fraction is preferably 5 to 95% by weight and the proportion of short fibers is correspondingly 95 to 5% by weight. With particular preference, the proportion of long fibers on the basis of the overall fiber fraction lies in the range from 15 to 85% by weight and the proportion of short fibers is correspondingly 85% to 15% by weight.

In addition to the fibers, the plastics material may also comprise any other fillers that are known to a person skilled in the art and have the effect of increasing stiffness and/or strength. These also include, inter alia, any desired particles without a preferential direction. Such particles are generally spherical, plate-shaped or cylindrical. The actual form of the particles may in this case deviate from the idealized form. Thus, spherical particles in particular may in reality also be for example droplet-shaped or flattened.

Apart from fibers, reinforcing materials that are used are, for example, graphite, chalk, talc and nanoscale fillers.

Glass fibers or carbon fibers are used with particular preference for reinforcement. Glass-fiber-reinforced polyamides are particularly preferred as the material for producing the rim.

If polyamides are used for reinforcement, it is possible to produce the body by what is known as a polyamide BODY process. For this purpose, continuous fibers are placed in a mold and impregnated with a monomer solution. The monomer solution is subsequently cured to form the polymer.

In a particularly preferred embodiment, the polymer material from which the wheel is produced comprises 30 to 70% by weight, preferably 35 to 65% by weight, of a polyamide or a mixture of at least two different polyamides and 30 to 70% by weight, preferably 45 to 65% by weight, of glass fibers. Suitable in particular as polyamides are PA 6, PA 4.6, PA 6.6, PA 6.10, PA 6.12 or partly aromatic polyamides, for example PA 6.T/6, PA 6.T/11, PA 6.T/12, PA 6.T/6-3.T, PA 6.T/6.6, PA 6.T/6.I, PA 6.I/6.T, PA 6.T/5-I.T, PA 6.T/6.I/6.6, PA 6.T/6.I/11, PA 6.T/6.I/12, PA 6.T/6.I/6.10, PA 6.T/6.I/6.12, PA 9.T/8-I.T, PA 6.T/10.T, PA 10.T/6.T, PA 10.T/6-3.T, PA 6.T/6.I/10.T/10.I, PA 6.T/6.I/8.T/8.I, PA 6.T/6.I/PACM.T/PACM.I, PA 6.T/6.I/MACM.T/MACM.I, PA 6.T/6.12, PA 6.T/6.10, PA 8.T/8.6, PA 8.T/8.I, PA 6.T/6.I/MXD.T/MXD.I or other polyamides containing terephthalic and/or isophthalic acid, and also mixtures thereof. Preferably used as reinforcing fibers are glass fibers or carbon fibers in the form of short or long fibers and also mixtures thereof. In the preferred form, the cross section of the fibers is round, but they may also have non-round, for example oval or flattened cross sections.

Apart from the polyamide and the glass fibers, the preferably used polymer material comprises 0 to 30% by weight, preferably 0 to 15% by weight, of an impact modifier, 0 to 1% by weight of a copper-containing heat stabilizer, for example CuI/KI, 0 to 5% by weight of a black pigment, for example carbon black, 0 to 1% by weight of a lubricant or mold release agent, for example N,N'-ethylene bis stearamide, for example Acrawax C®, 0 to 1% by weight of a phosphite (secondary) antioxidant, for example tris(2,4-di-tert-butylphenyl)phosphite, for example Irgafos 168®, 0 to 1% by weight of a phenol (primary) antioxidant, for example N,N'-hexamethylene-bis[3-(3,5-di-t-butyl-4-hydrophenyl)propionamide], for example Irganox 1098®, 0 to 1% by weight of a hindered amine stabilizer (HALS), for example 1,3-benzyl dicarboxamide, N,N'-bis(2,2,6,6-tetramethyl-4-piperidinyl), for example obtainable as Nylostab S-EED®).

Furthermore, for increased heat stabilization, it may comprise 0 to 2% by weight of a polyethyleneimine homopolymer or copolymer, for example Lupasol WF®, and 0 to 20% by weight of iron powder. Preferred iron powders are obtainable by thermal decomposition of iron pentacarbonyl.

For an antistatic finish, also suitable are 0 to 20% by weight of carbon-containing additives, for example conductive carbon black, carbon nanotubes, carbon fibers and "vapor grown carbon nanotubes".

Preferably used as impact modifiers are ethylene copolymers or ethylene/methacrylic acid copolymers. The ethylene copolymer may in this case be functionalized with 0.1 to 1% maleic acid anhydride. Preferably used as comonomers are 1-butene and 1-octene. When 1-butene is used as the comonomer, the ethylene preferably has a proportion by weight of 55 to 85.7% and, when 1-octene is is used as the comonomer, a proportion by weight of 50 to 64.9%. The proportion of 1-butene is correspondingly around 14 to 44% by weight, or of 1-octene around 35 to 49%. Acrylic acid, maleic acid or maleic acid anhydride may be used as the reactive acid. The proportion of the reactive acid is preferably around 0.3 to 1% by weight. Apart from 1-butene and 1-octene, 1-hexene is alternatively also suitable as the comonomer.

EXAMPLES OF SUITABLE POLYMER MATERIALS

Hereafter, additive package 1 means that the mixture comprises 0.15% by weight of CuI/KI mixture, 1.64% by weight of carbon black, 0.25% by weight of Acrawax C® (N,N'-ethylene bis stearamide), 0.10% by weight of Irgafos 1680 (tris(2,4-di-tert-butylphenyl)phosphite), 0.10% by weight of Irganox 1098® (N,N'-hexamethylene-bis[3-(3,5-di-t-butyl-4-hydrophenyl)propionamide]), and 0.30% by weight of Nylostab SEED® (N,N'-bis(2,2,6,6-tetramethyl-4-piperidinyl)).

Additive package 2 comprises 0.25% by weight of Lupasol WF® (polyethyleneimine) and 1.0% by weight of carbonyl iron powder.

Example 1

A suitable polymer mixture is made up of PA 6.6/6.10 in a ratio of 60/40% by weight. It also comprises 60% by weight of long glass fibers, 4% by weight of ethylene copolymer as an impact modifier, for example Fusabond® N416, and additive package 1.

Example 2

A further suitable polymer mixture largely corresponds to that described in Example 1. However, instead of 4% by weight of ethylene copolymer as an impact modifier, it comprises 8% by weight.

Example 3

A further alternative polymer mixture corresponds to that in Example 1, but, instead of 60% by weight of long glass fibers, comprises 40% by weight of long glass fibers and 20% by weight of short glass fibers.

Example 4

A further possible polymer mixture comprises PA 6.10 and 60% by weight of long glass fibers. Here, too, it additionally comprises additive package 1.

Example 5

A further polymer mixture for producing the wheel corresponds to that in Example 4, but additionally comprising as an impact modifier 4% by weight of ethylene/methacrylic acid copolymer (90/10), neutralized to about 70% with zinc, for example Surlyn® 9520.

Example 6

A further suitable polymer mixture corresponds to the composition in Example 4, but a PA 6.6 is used instead of the PA 6.10.

Example 7

A further suitable polymer mixture corresponds to the composition in Example 6, but additionally comprising as an impact modifier 4% by weight of an ethylene copolymer functionalized with about 1% maleic acid anhydride, for example Fusabond N493®.

Example 8

A further suitable polymer mixture corresponds to that in Examples 4 and 6, but a PA 6.6.I/6.T with a mixing ratio of 70:30% by weight is used as the polyamide.

Example 9

In a further embodiment, 4% by weight of an ethylene copolymer functionalized with 0.5 to 1% of maleic acid anhydride, for example Exxelor® VA1803, is admixed as an impact modifier with the polymer mixture from Example 8.

Example 10

In a further embodiment, a PA 6.T/6 with an average viscosity number of 100 ml/g is used as the polymer. It additionally comprises 60% by weight of long glass fibers and additive package 1.

Example 11

In a further alternative embodiment, 4% of an ethylene copolymer functionalized with 0.2 to 0.3% maleic acid anhydride, for example Fusabond® NM 598 D, is added as an impact modifier to the polymer mixture from Example 10.

Example 12

A further suitable polymer mixture corresponds to that from Example 1, with the additive mixture 2 being additionally added.

Example 13

In a further embodiment, additive package 2 and 6% by weight of PA 6 are additionally admixed with the polymer mixture from Example 6.

Example 14

A further suitable polymer mixture corresponds to that from example 7, with additive package 2 and 6% by weight of PA 6 being additionally admixed.

Example 15

A further alternative polymer mixture comprises PA 6.6/6.10 in a ratio of 60/40% by weight, 56% by weight of long glass fibers, 4% by weight of ethylene copolymer as an impact modifier, for example Fusabond® N416, 4% by weight of conductive carbon black, for example Printex® XE2 from Evonik or Chesacarb A, and additive package 1.

Example 16

A further polymer mixture comprises PA 6.6/6.10 in a ratio of 60/40% by weight, 58% by weight of long glass fibers, 4% by weight of ethylene copolymer as an impact modifier, for example Fusabond® N416, 2% by weight of carbon nanotubes, for example Nanocyl® NC 7000, and additive package 1.

Example 17

A further suitable polymer mixture comprises PA 6.6/6.10 in a ratio of 60/40% by weight, 40% by weight of long glass fibers, 4% by weight of ethylene copolymer as an impact modifier, for example Fusabond® N416, 15% by weight of carbon fibers, for example Tenax®-J/E, type HT C604, and additive package 1.

Example 18

In a further embodiment, the polymer mixture comprises PA 6.6/6.10 in a ratio of 60/40% by weight, 58% by weight of long glass fibers, 4% by weight of ethylene copolymer as an impact modifier, for example Fusabond® N416, 2% by weight of vapor grown carbon nanotubes, for example VGCF® or VGCF®-H from the company Showa Denko, and additive package 1.

BRIEF DESCRIPTION OF THE FIGURES

Exemplary embodiments of the invention are explained in more detail in the description which follows and are represented in the figures, in which.

EXEMPLARY EMBODIMENTS OF THE INVENTION

Figure 1:
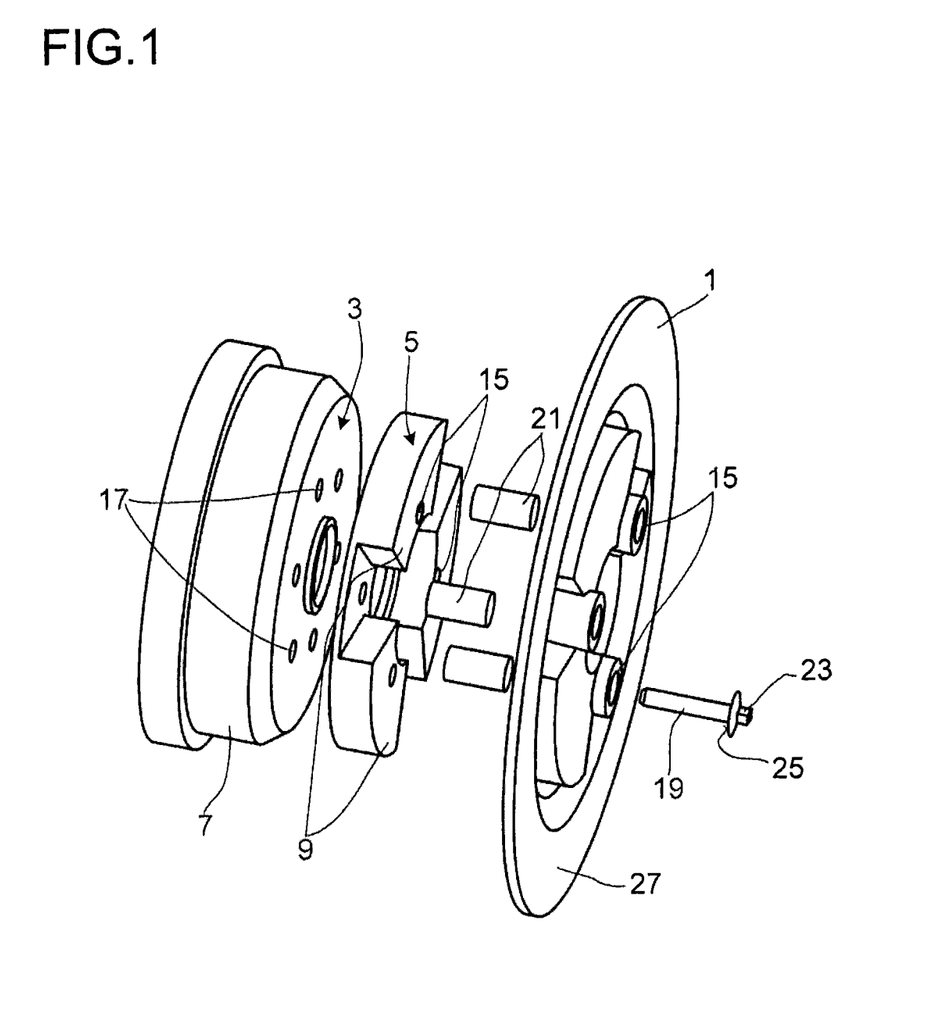
FIG. 1 shows an exploded drawing of a unit according to the invention with a rim, an adapter and a wheel mounting.
Figure 2:
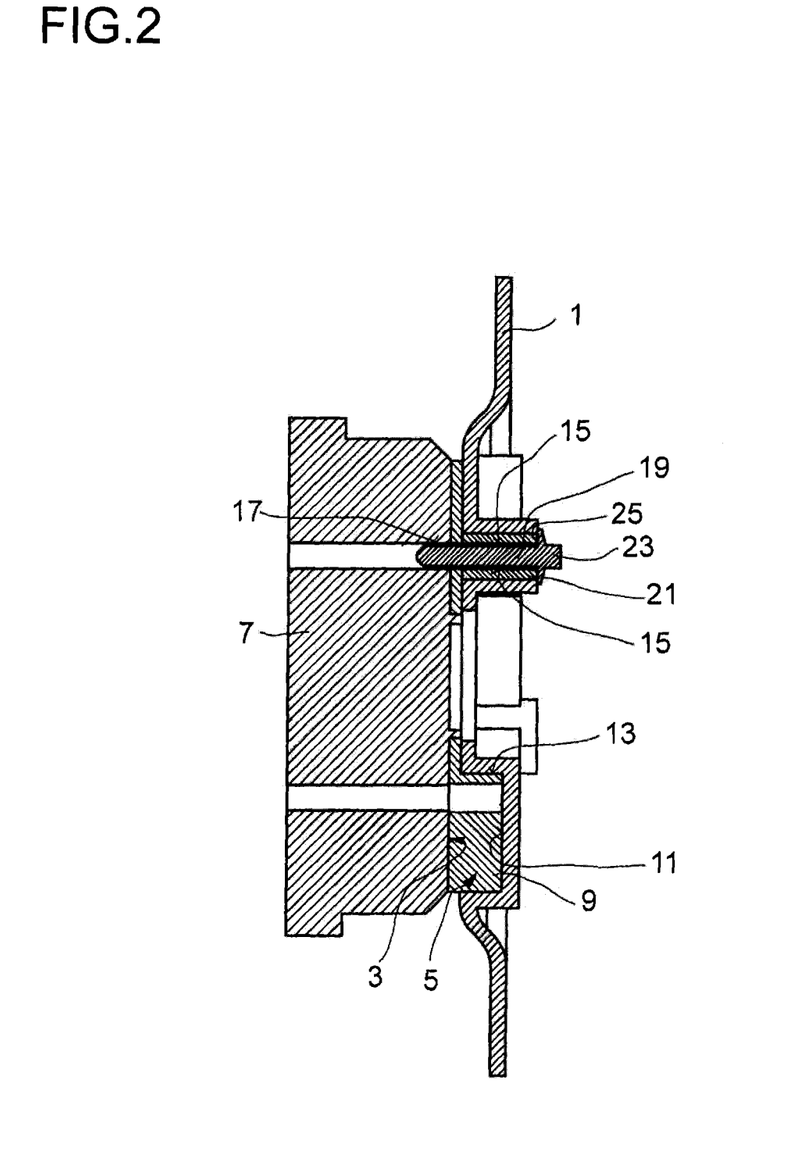
FIG. 2 shows a sectional representation of an assembled unit according to the invention with a rim, an adapter and a wheel mounting.

FIG. 1 shows an exploded drawing of a unit according to the invention, with a rim, an adapter and a wheel mounting, and FIG. 2 shows a sectional representation of the assembled unit.

A body 1, of which only the wheel disk without the body ring that receives the tire is shown here, is connected to a wheel mounting 3. In the case of conventional bodies made of metal, the force is transmitted from the wheel mounting 3 to the body 1 by friction. On account of the lower strength of plastics and the tendency to creep under shearing forces that occur, this is not possible however in the case of bodies 1 made of plastic. According to the invention, the body 1 is therefore fastened to the wheel mounting 3 by an adapter 5.

The wheel mounting 3 is, for example, as shown here, a brake drum 7. Apart from a brake drum 7, the wheel mounting 3 may also be part of a brake disk. It is also possible to form the wheel mounting 3 as part of an electric motor in the case of an electrically driven vehicle. Furthermore, it is also possible to form the wheel mounting 3 as a wheel hub.

If a body 1 of plastics material is used, the force is transmitted from the wheel mounting 3 through the adapter 5 to the body 1 by means of positive engagement. For this purpose, protuberances 9 are formed on the adapter 5. After assembly, the protuberances 9 engage in recesses 11 on the body 1. The force transmission then takes place from the protuberances 9 to the recesses 11 in the body 1 by positive engagement.

In order to obtain a positive engagement between the protuberances 9 of the adapter 5 and the recesses 11 in the rim, the sides 13 of the protuberances 9 and the recesses 11 are preferably conically formed. The conical form allows the protuberances 9 to be pressed into the recesses 11 and a dimensionally stable connection between the protuberances 9 and the recesses 11 to be achieved.

The fastening of the body 1 to the wheel mounting 3 by the adapter 5 preferably takes place by screwing. For this purpose, screw through-holes 15 are provided in the body 1 and in the adapter 5. Holes with an internal thread 17 are formed in the wheel mounting 3. For assembly, a screw 19, preferably a flanged screw, is passed through the screw through-openings 15 in the body 1 and the adapter 5 and screwed in the hole with internal thread 17 in the wheel mounting.

In order, during assembly, not to deform the body 1 produced from plastic, bushes 21 are preferably inserted in the screw through-openings 15 of the body 1. The bushes 21 are in this case produced from a material which is not deformed by compressive force such as that exerted by the screw 19 on the bush. Suitable material for the bushes 21 are, for example, metals such as iron in the form of cast iron or steel, aluminum, titanium or ceramics.

As already described above, the adapter 5 is preferably produced from a metal, a ceramic or a highly filled plastic, the material being selected such that force transmission by means of frictional engagement does not cause any deforming of the adapter 5 to take place, for example by creep. The adapter 5 and the bushes 21 may be produced from the same material, but it is also possible to use different materials for the bushes 21 and the adapter 5. In order to obtain a stable connection, the screw 19 preferably has a screw head 23 with a flat underside 25. The screw head 23 is pressed with the underside 25 against the body 1 and a stable connection is thereby achieved.

As an alternative to the embodiment represented in FIGS. 1 and 2, it is also possible to provide the recesses 11 on the outer side 27 of the body 1. In this case, the adapter with a disk on the outside lies on the outer side of the body and the protuberances of the adapter point in the direction of the wheel mounting, so that they can engage in the recesses of the rim. To be able to transmit the force from the wheel mounting to the adapter, the adapter also has at least one protuberance, which is passed through the body and lies against the wheel mounting. It is preferred if the protuberance is passed centrally through the rim.

Figure 3:
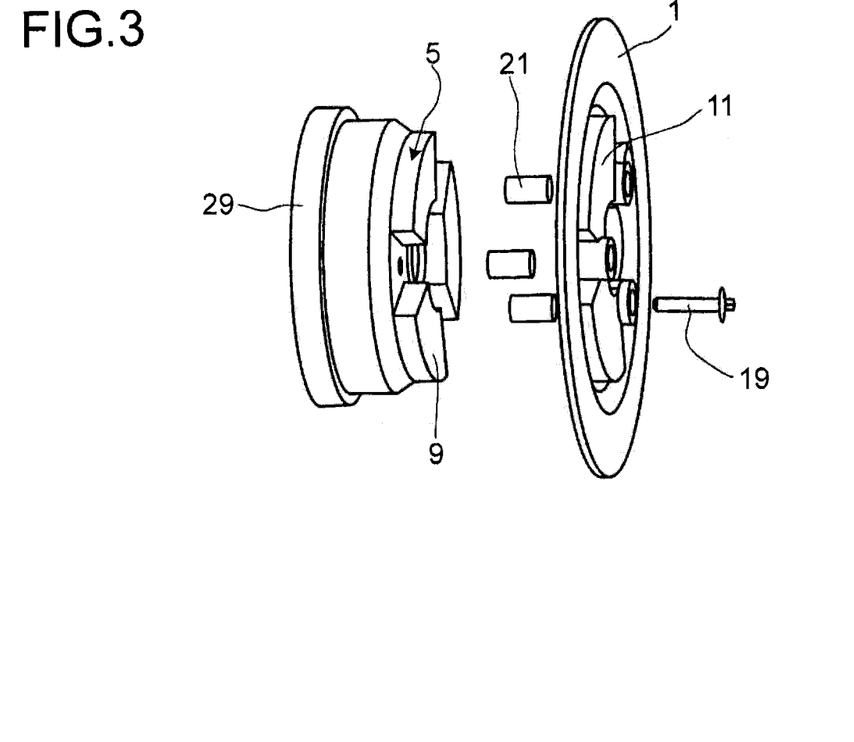
FIG. 3 shows an exploded drawing of a unit according to the invention with a body and an adapter, the adapter being formed as one part with a wheel mounting.
Figure 4:
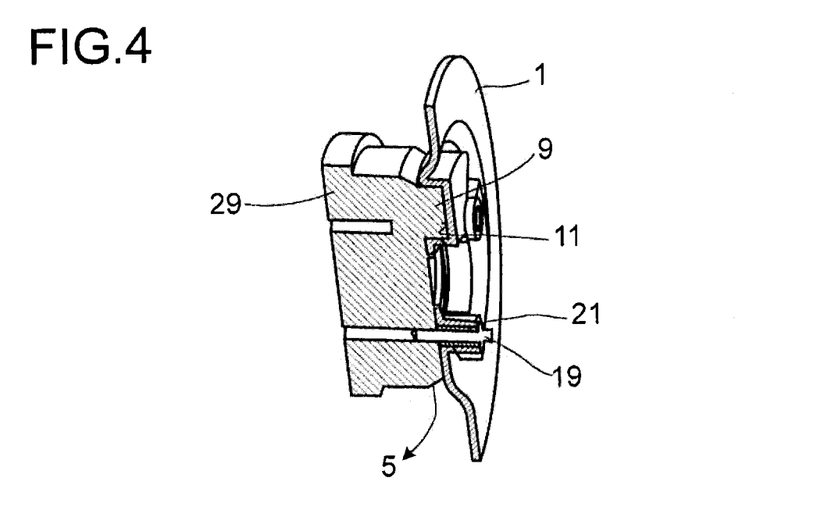
FIG. 4 shows a three-dimensional sectional representation of the unit according to the invention from FIG. 3 in the assembled state.

Furthermore, it is also possible to form the adapter in one part with the wheel mounting. This is shown in FIGS. 3 and 4.

In this case, the protuberances 9 are formed directly on the wheel mounting 3, generally on the hub 29. Alternatively, the adapter 5 may in this case also be connected to the wheel mounting 3 by a positively engaging process, for example by welding. Furthermore, it is also possible to connect the adapter 5 to the wheel mounting 3 initially in a non-positively engaging manner, for example by screwing, and then to connect the body to the wheel mounting 3 by the adapter 5 or through screw through-holes 15 in the adapter 5.

In a further embodiment, it is also possible to form the adapter 5 in one part with the rim. In this case, the bushes 21 may be used for example as adapters 5. In order to obtain a sufficiently large supporting area of the bushes 21 on the wheel mounting 3, it is preferred in this case to form the bushes with a correspondingly great wall thickness or alternatively to provide a dish-shaped widening on the bushes, on the side facing the wheel mounting 3, with which the bushes then lie against the wheel mounting 3. Alternatively, however, the adapter 5, as it is represented in FIGS. 1 and 2, may be formed as one part with the body 1, for example by the adapter 5 being encapsulated by the body material in an injection-molding process. In the case of a one-part form of the adapter 5 and the body 1, a stable connection may be achieved for example by providing the adapter 5 with undercuts into which the plastics material of the body 1 is injected.

Figure 5:
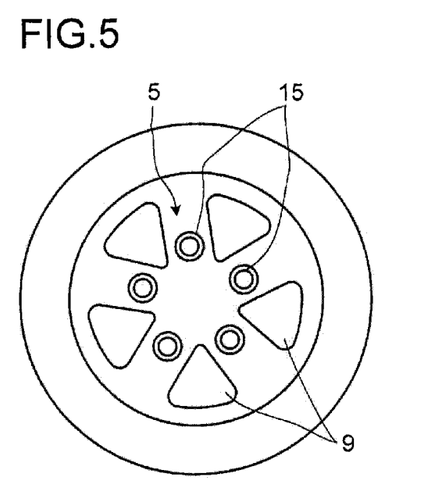
FIGS. 5 to 8 show plan views of adapters in various embodiments.
Figure 6:
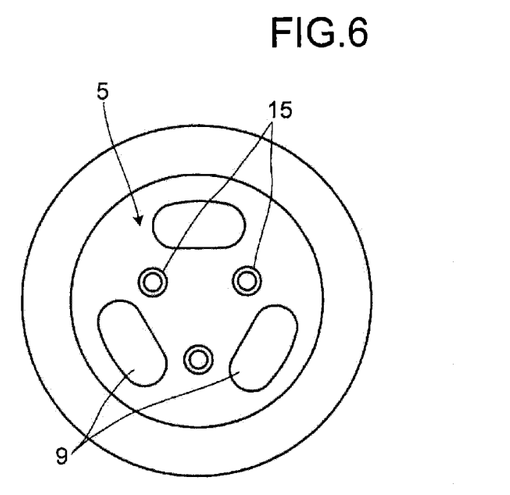
Figure 7:
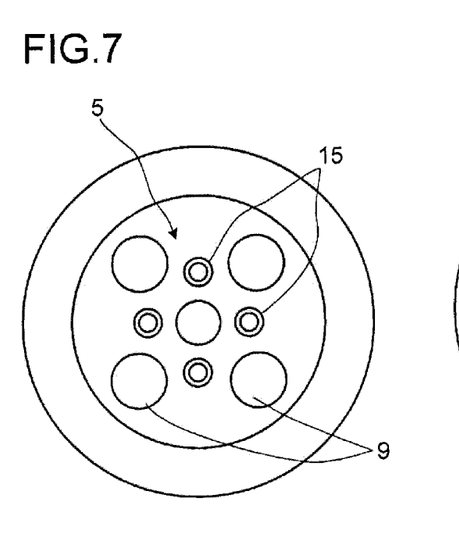
Figure 8:
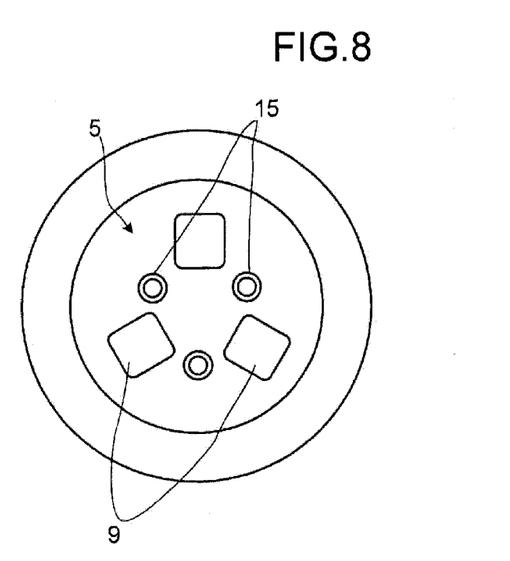

In FIGS. 3 to 6, various embodiments of the adapter 5 are shown. Depending on the size of the body and the form of the wheel mounting 3, the adapter 5 has three, four or five screw through-holes 15 for fastening the body 1. The number of screw through-holes 15 is not tied here to the form of the protuberances 9 that are represented in FIGS. 3 to 6. For example, instead of the five screw through-holes 15 and five triangular protuberances 9 represented in FIG. 3, it is also possible to provide in each case three or four screw through-holes 15 and three or four protuberances 9. Alternatively, it is correspondingly also possible in the case of the embodiment represented in FIG. 4 to provide four or five screw through-holes 15 and correspondingly the same number of oval protuberances 9. This also applies correspondingly to the circular protuberances 9 that are represented in FIG. 5 and the square protuberances that are shown in FIG. 6. In order to avoid damage to the body occurring at the edges and corners of the protuberances in the case of trapezoidal, trianglular, square or any other configurations with corners and edges as a result of high forces being applied, the edges and corners of the protuberances 9 are preferably rounded off.

In addition to the protuberances represented here in FIGS. 3, 4 and 6, it is possible, for example, to provide a further, preferably circular, protuberance in the middle.

In order to obtain a uniform force transmission from the adapter 5 to the body 1, it is preferred if, as in the embodiments represented here, the protuberances 9 are arranged in such a manner that they are distributed rotationally symmetrically about the center point of the adapter 5. In this case, it is not necessary for all the protuberances 9 to be at the same distance from the center point of the adapter. The protuberances 9 may also be arranged at different distances, it being preferred here if in each case at least 2 protuberances 9 are at the same distance from the center point and the protuberances 9 at the same distance are each arranged point-symmetrically about the center point of the adapter 5.

Figure 9:
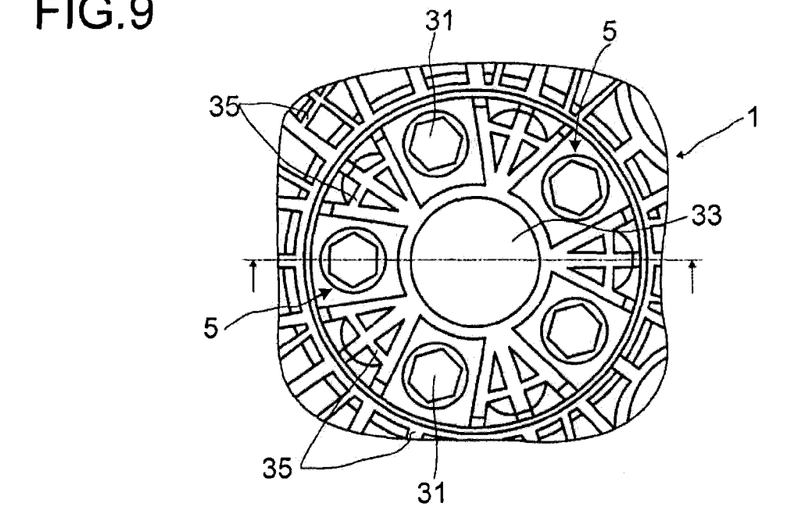
FIG. 9 shows a plan view of a detail of a body with multiple adapters.

FIG. 9 shows a plan view of a detail of a body with multiple adapters.

If multiple adapters 5 are used, they are preferably arranged such that they are distributed rotationally symmetrically about the center point of the adapter 5. The distance respectively between two adapters 5 should be equal here in each case. It is particularly preferred if the adapters 5 are arranged such that there is always an adapter 5 at a position at which there is a through-opening for a screw 31 for fastening the body 1 to a wheel mounting. If multiple adapters 5 are used, the adapters are preferably respectively configured in the form of segments of a circle. However, any other desired form can also be used. For example, the adapters 5 may also be formed as a polygon with three or more corners, it being possible for at least one side of the polygon also to be given the form of a rounding. The rounding may be both concavely and convexly formed. Thus, the adapter 5 represented here in FIG. 9 is formed as a polygon with four corners, two opposite sides having no curvature and the two other opposite sides respectively having a rounding, one rounding, that is the one facing the central opening 33 of the rim, being concave and the rounding of the opposite side being convex.

To improve the strength and reduce the weight, the body 1 of which a detail is shown here is provided with ribs 35.

Some of the ribs 35 in this case point outward from the center point in a star shape. Some others of the ribs 35 are formed in the circumferential direction.

If the adapters 5 are respectively arranged as the extension of spokes of the body 1, the adapters 5 may have a portion not represented here which extends in the direction of the spoke. For this purpose it is possible, for example, to lengthen the adapter 5 in the direction of the spoke. The portion which extends in the direction of the spoke may in this case have the same thickness as the adapter 5 or be produced with a smaller thickness.

Figure 10:
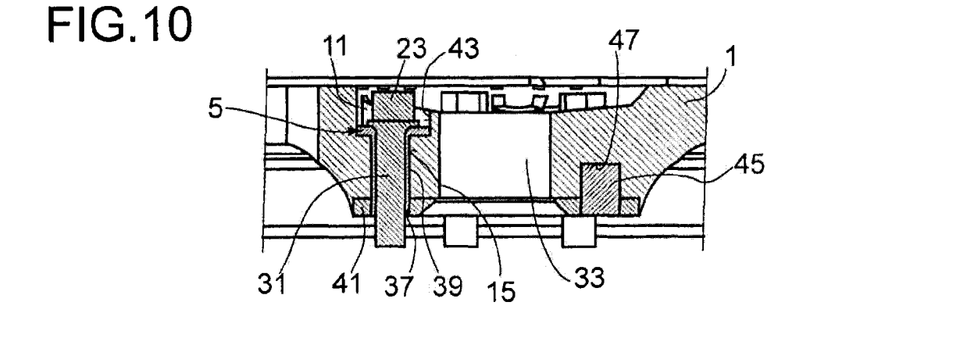
FIG. 10 shows a sectional representation corresponding to the plan view represented in FIG. 9.

FIG. 10 shows a sectional representation corresponding to the plan view represented in FIG. 9. This representation reveals that the adapter 5 is formed as a disk which lies in the recess 11 of the body 1. The adapter 5 is connected in one part to a sleeve 37, which is passed through the screw through-hole 15 of the body 1. The sleeve 37 serves in this case for additionally improving the strength of the rim. With the end facing away from the adapter 5, the sleeve 37 fits exactly in an opening 39 in a disk 41. The disk 41 is formed as a ring and, on the side facing the wheel mounting, lies against the body 1. The disk 41 is in this case preferably formed such that, after assembly, it lies with a peripheral edge uniformly against the wheel mounting. For this purpose it is possible, for example, to form the side of the disk 41 that is facing the wheel mounting conically, a cone with a very small vertex angle already being sufficient. Apart from a ring-shaped disk 41 to which all the adapters 5 that are used are connected, it is alternatively also possible to assign each adapter 5 a disk or to provide multiple disks which are respectively connected to at least two adapters 5. The use of only one disk 41, which encloses the central opening 33 in the body in an annular manner, is preferred however.

In the embodiment presented here, the recess 11, in which the adapter 5 is accommodated, is deeper than the adapter, so that the adapter 5 lies completely in the recess and the side walls 43 of the recess 11 protrude above the adapter, so that the screw 31 is likewise accommodated with its screw head 23 in the recess. The adapter has in this case an opening adapted to the type of screw that is used, so that the body 1 can be fastened to the wheel mounting by conventional wheel screws, for example, taper-collar screws or spherical-collar screws. In FIG. 10, taper-collar screws are shown by way of example.

For additional force transmission from the disk 41 to the rim, apart from the sleeves 37 and the screws 31 it is also possible to provide bolts 45, which engage in corresponding blind holes 47 of the body 1. The blind holes are in this case respectively located between two screw through-holes 15. As an alternative to the bolts, it is also possible to form the disk with protuberances of any desired shape and to provide recesses in which the protuberances engage in the rim, so that the disk likewise acts as an adapter.

Figure 11:
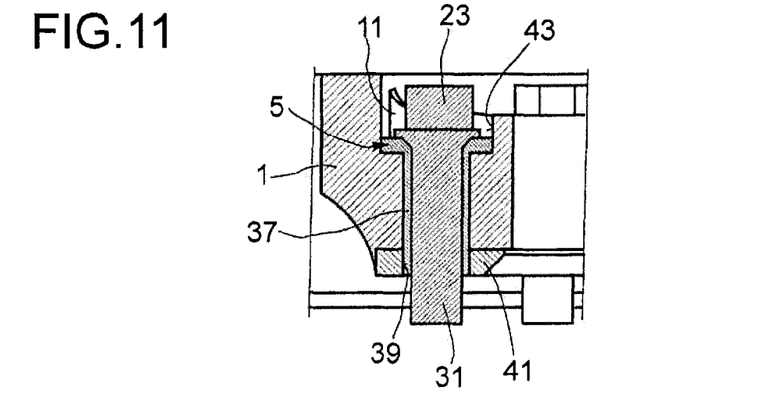
FIG. 11 shows a sectional representation of a body portion with an adapter with a sleeve formed as one part thereon.

Apart from the one-part form of the sleeve 37 and the adapter 5 such as that shown in FIG. 10, it is alternatively also possible to form the adapter 5 and the sleeve 37 as two parts. In this case, the sleeve may, as shown in the case of the disk 41, be passed through an opening in the adapter in an exactly fitting manner or alternatively and with preference lie with an end face against the adapter 5, as shown in FIG. 11.

LIST OF DESIGNATIONS

1 Rim
3 Wheel mounting
5 Adapter
7 Brake drum
9 Protuberance
11 Recess
13 Side
15 Screw through-hole
17 Hole with internal thread
19 Screw
21 Bush
23 Screw head
25 Underside
27 Outer side
29 hub
31 Screw
33 Central opening
35 Rib
37 Sleeve
39 Opening
41 Disk
43 Side wall of the recess 11
45 Bolt
47 Blind hole

The invention claimed is:

1. A vehicle wheel, comprising:
a body of a plastics material, the body including multiple recesses therein; and multiple adapters for fastening the body to a wheel mounting, each adapter comprising at least one protuberance, which engages in a respective recess in the body, such that each adapter engages in a recess of the body over a full surface area of the adapter, the adapter being arranged in such a way that the adapter is positioned between the body and the wheel mounting, and wherein each adapter is formed as a polygon with four corners, two opposite sides having no curvature and the two other opposite sides respectively having a rounding, one rounding being concave and the other rounding being convex, the vehicle wheel further comprising:
a disk;
at least one opening in the body;
a sleeve; and
an opening in the wheel mounting or the disk,
wherein the disk is connected to the adapter through the at least one opening in the body, and the disk is arranged on the side of the body that is facing the wheel mounting and
wherein the at least one opening in the body accommodates the sleeve, and the sleeve lies with one end facing against the wheel mounting or against the disk, or the sleeve lies against the opening in the wheel mounting or the disk without any play over an entire circumference of the sleeve.

2. The vehicle wheel according to claim 1,
wherein the disk has a peripheral edge which is in contact with the wheel mounting.

3. A vehicle wheel comprising:
a body of a plastics material, the body including multiple recesses therein;
multiple adapters for fastening the body to a wheel mounting, each adapter comprising at least one protuberance which engages in a respective recess in the body, such that the adapter engages in a recess of the body over a full surface area of the adapter, the adapter being arranged in such a way that the adapter is positioned between the body and the wheel mounting and wherein each adapter is formed as a segment of a circle;
a disk;

at least one opening in the body wherein the disk is connected to the adapter through the at least one opening in the body, and the disk is arranged on the side of the body that is facing the wheel mounting;

a sleeve; and an opening in the wheel mounting or the disk, wherein the at least one opening in the body accommodates the sleeve, and the sleeve lies with one end facing against the wheel mounting or against the disk, or the sleeve lies against the opening in the wheel mounting or the disk without any play over an entire circumference of the sleeve.

4. The vehicle wheel according to claim 1,
wherein the sleeve is formed in one part with the adapter or in one part with the disk.

5. The vehicle wheel according to claim 3,
wherein the sleeve is formed in one part with the adapter or in one part with the disk.

6. The vehicle wheel according to claim 1,
wherein each adapter is assigned an individual disk.

7. The vehicle wheel according to claim 1,
wherein the multiple adapters are formed integrally with the wheel mounting.

8. The vehicle wheel according to claim 1,
wherein one adapter is respectively arranged at every position at which a through-hole for screwing the body to the wheel mounting is formed.

9. The vehicle wheel according to claim 1,
wherein the protuberances of the adapter and the recesses of the body are conically formed, so that the protuberances of the adapter are pressed into the recesses of the body.

10. The vehicle wheel according to claim 1,
wherein the adapter is produced from a material which allows a force transmission between the wheel mounting and the adapter by friction.

11. The vehicle wheel according to claim 1,
wherein the adapter is produced from a metallic material, from ceramic or a filled plastic.

12. The vehicle wheel according to claim 1,
wherein a material for the body and a material for the adapter are independently chosen such that a coefficient of linear thermal expansion of the material for the body and a coefficient of linear thermal expansion of the material for the adapter differ by no more than 70%.

13. The vehicle wheel according to claim 1,
wherein the plastics material of the body is chosen from polybutylene terephthalate, polyethylene sulfone, polysulfone, polypropylene or polyamide.

14. The vehicle wheel according to claim 1,
wherein the plastics material of the body is reinforced.

15. The vehicle wheel according to claim 7,
wherein the reinforced plastics material comprises a short fiber, long fiber or continuous fiber.

16. The vehicle wheel according to claim 15,
wherein the reinforced plastics material of the fibers is chosen from carbon, glass, aramid, basalt, a metal or a mineral.

17. The vehicle wheel according to claim 1,
wherein the body comprises spokes,
the adapters are positioned as an extension of the spokes of the body, and
each adapter has a portion that extends in the direction of the spoke, for strengthening the spoke.

18. The vehicle wheel according to claim 1,
wherein the disk is a single disk and all adapters are connected to the disk.

19. The vehicle wheel according to claim 1,
wherein the disk is connected to at least two adapters.

20. A vehicle wheel comprising:

a body of a plastics material, the body including multiple recesses therein;

multiple adapters for fastening the body to a wheel mounting, each adapter comprising at least one protuberance which engages in a respective recess in the body, such that the adapter engages in a recess of the body over a full surface area of the adapter, the adapter being arranged in such a way that the adapter is positioned between the body and the wheel mounting;

a disk;

at least one opening in the body wherein the disk is connected to the adapter through the at least one opening in the body, and the disk is arranged on the side of the body that is facing the wheel mounting;

a sleeve; and an opening in the wheel mounting or the disk, wherein the at least one opening in the body accommodates the sleeve, and the sleeve lies with one end facing against the wheel mounting or against the disk, or the sleeve lies against the opening in the wheel mounting or the disk without any play over an entire circumference of the sleeve.

\* \* \* \* \*